C. J. COBERLY.
CUTTING TORCH.
APPLICATION FILED JUNE 8, 1920.
1,404,011.
Patented Jan. 17, 1922.
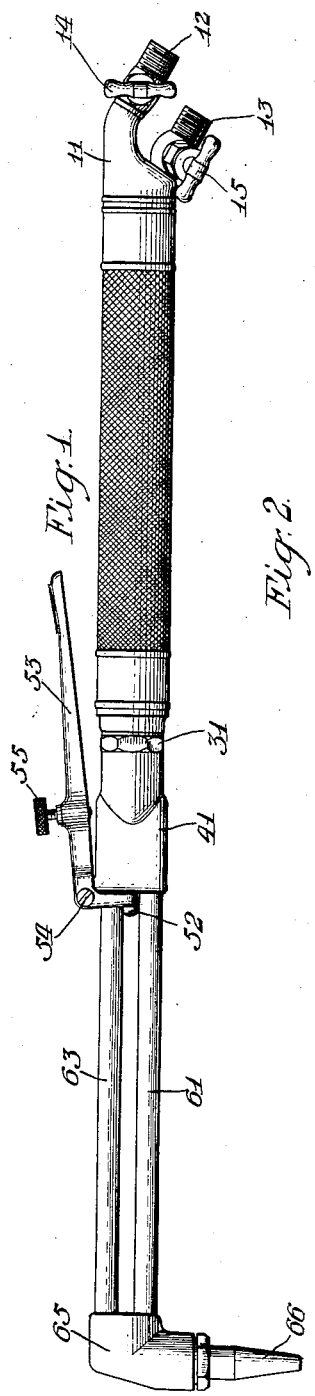
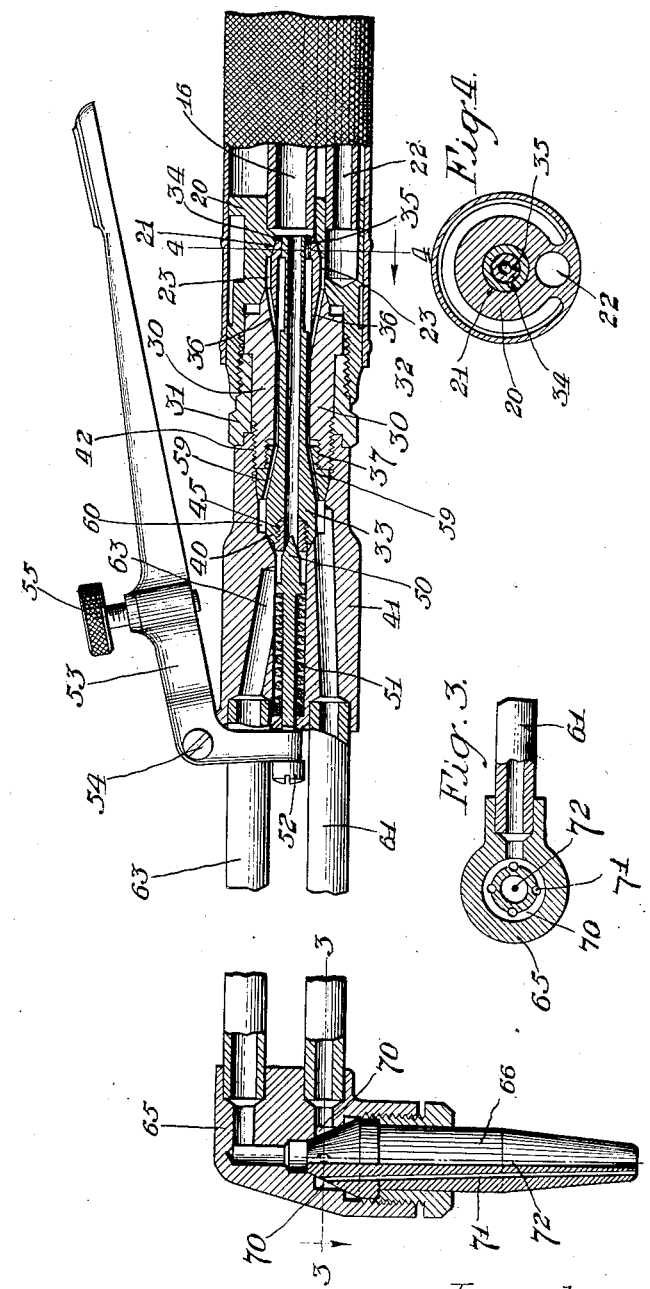
Inventor.
Clarence J. Coberly
by Graham + Davis
Attorneys.

UNITED STATES PATENT OFFICE.

CLARENCE J. COBERLY, OF LOS ANGELES, CALIFORNIA, ASSIGNOR TO CALIFORNIA BURDETT OXYGEN COMPANY, A CORPORATION OF CALIFORNIA.

CUTTING TORCH.

1,404,011. Specification of Letters Patent. Patented Jan. 17, 1922.

Application filed June 8, 1920. Serial No. 387,488.

*To all whom it may concern:*

Be it known that I, CLARENCE J. COBERLY, a citizen of the United States, residing at Los Angeles, county of Los Angeles, and State of California, have invented a new and useful Cutting Torch, of which the following is a specification.

My invention relates to torches which are used for cutting metals by the action of the oxygen flame. It is particularly applicable to torches using oxygen and acetylene although it may be used in torches using oxygen, hydrogen or other gases.

The embodiment shown is designed to be used interchangeably with the welding torch illustrated in my accompanying application, Serial No. 387,487, the main portion of the torch illustrated in this application being the same as that illustrated in my co-pending application, the object of this arrangement being that by a simple change the operator can change from a cutting torch to a welding torch without the necessity for disconnecting the source of gas supply.

An object of the invention is to provide a torch by which superior results can be obtained in the hands of a novice. The art of cutting metals by the oxy-acetylene or oxy-hydrogen flame which has previously been considered requires a considerable degree of skill. By the use of my invention it is possible for any person to follow a simple set of directions to produce excellent results.

It is a further object of my invention to provide means on the torch by which the size of the flame can be regulated at the torch to suit the thickness of the material to be cut without changing the tip or the pressure of the source of gas supply.

Further objects and advantages will be made more evident hereinafter.

In the drawings which are for illustrative purposes only,

Fig. 1 is a side elevation of my invention.

Fig. 2 is an elevation on an enlarged scale and partly in section.

Fig. 3 is a section on a plane represented by the line 3—3 of Fig. 2.

Fig. 4 is a section on a plane represented by the line 4—4 of Fig. 2.

In the form of the invention shown in these drawings, a member 11 is provided having a connection 12 to which an oxygen supply pipe not shown is attached and having a connection 13 to which an acetylene supply pipe 13 not shown is attached, the supply of either gas may be entirely shut off by means of valves 14 and 15. The gas used is ordinarily supplied from pressure tanks, not shown, the pressure delivered to the torch being controlled by automatic regulators which are old in the art and therefore not shown. These regulators may be set to give any desired pressure below the tank pressure and will supply the gas within very close limits of this pressure. The oxygen passes through the connection 12 and through an oxygen supply pipe 16 into the end of a central conical cavity 21 in a head 20. The acetylene is delivered through an acetylene supply pipe 22 into a groove 23 formed in the wall of the conical cavity 21. Seated in gas tight relationship with the walls of the cavity 21 is a mixing tube 30, this tube being clamped in place by a nut 31. The mixing tube 30 has a central opening 32 in which a quill 33 is placed. The quill 33 closes one end of the central opening 32 as shown at 34, a small hole 35 being, however, drilled therein to allow oxygen to pass from the oxygen supply pipe 16 into the space surrounding the quill 33 and inside the opening 32. Acetylene is admitted to the same space through a plurality of small drilled holes 36 in the mixing tube 30. The quill 33 is threaded at 37 to hold it in place in the mixing tube 30, being provided with a conical head 40 seating in a conical cavity in a body 41. The body 41 is threaded at 42 to the mixing tube 30, a removable seat 45 is provided in the end of the quill 33 against which the end of a valve 50 is placed by a compression spring 51, the valve 50 is provided with a head 52 engaged by a hand lever 53 pivoted at 54 on the body 41, and provided with a calibrated adjusting screw 55. By turning the adjusting screw 55 in or out, the degree that the valve 50 is opened when the lever 53 is pushed down may be accurately predetermined. The space surrounding the quill 33 communicates with a cavity 60 through drilled holes 59, the cavity 60 being in open communication with the heating jet pipe 61 at all times. The central opening in the quill 33 which is normally closed by the valve 50 is placed in communication with the cutting jet pipe 63 whenever the valve 50 is unseated. The oxygen delivered through the cutting jet pipe 63 passes into a member 65 containing a tip 66, the oxygen passing centrally through the tip, the heating jet pipe 61 communicates with a cavity 70, member 65 communicating with a small opening 71 which extends downwardly through the tip 66 around a central opening 72 through which the oxygen passes.

The method of operation is as follows:

The oxygen delivered by the oxygen pipe 16 passes through the small drilled hole 35 into the space surrounding the quill 33 where it mixes with the acetylene delivered through the holes 59 into the space 60 and into the heating jet pipe 61 through an opening 70, the mixed gases passing through small openings 71 in the tip 66 and being ignited to form the heating jet. The regulators being set according to instructions the mixture necessary for the heating jet is obtained, due to the proper proportion in the parts. When it is desired to start the cutting operation, the hand lever 53 is depressed, thus unseating the valve 50 and allowing oxygen to flow through the cutting jet pipe 63, the central opening 72 and the tip 66. The amount of opening of the valve 50 must necessarily be adjusted to the thickness of the material to be cut, this adjustment being insured by the screw 55 which is marked on its shank with numbers representing certain thicknesses of material. It is therefore not necessary for the user of the torch to have any special experience in handling these torches as by adjusting the screw 55 as directed, he delivers the proper amount of oxygen necessary for the best results.

I claim as my invention:

1. A cutting torch comprising a head having a thread formed thereon, a primary pipe delivering gas to a conical cavity formed in said head, a secondary pipe delivering gas to a groove formed in the wall of said cavity, a body, a mixing tube secured at one end in said body and tapered at the other end to seat in said cavity, a nut having a thread engaging the thread on said head and engaging a shoulder formed on said mixing tube, a heating jet pipe secured in said body and connected through openings in said mixing tube with said primary and said secondary pipes, a cutting jet pipe connected through passages with said primary pipe, and a tip fed with gases from said heating jet pipe and said cutting jet pipe.

2. A cutting torch comprising a head having a thread formed thereon, a primary pipe delivering gas to a conical cavity formed in said head, a secondary pipe delivering gas to a groove formed in the wall of said cavity, a body, a mixing tube secured at one end in said body and tapered at the other end to seat in said cavity, a nut having a thread engaging the thread on said head and engaging a shoulder formed on said mixing tube, a heating jet pipe secured in said body and connected through openings in said mixing tube with said primary and said secondary pipes, a cutting jet pipe connected through passages with said primary pipe, a manually operable valve spring actuated to close one of said passages between said primary and said cutting jet pipe, and a tip fed with gases from said heating jet pipe and said cutting jet pipe.

3. A cutting torch comprising a head having a thread formed thereon, a primary pipe delivering gas to a conical cavity formed in said head, a secondary pipe delivering gas to a groove formed in the wall of said cavity, a body, a mixing tube secured at one end in said body and tapered at the other end to seat in said cavity, a nut having a thread engaging the thread on said head and engaging a shoulder formed on said mixing tube, a quill threaded in a central opening in said mixing tube and having a conical head seating in said body, a heating jet pipe secured in said body and connected through openings in said mixing tube with said primary and said secondary pipes, a cutting jet pipe connected through passages with said primary pipe, and a tip fed with gases from said heating jet pipe and said cutting jet pipe.

4. A cutting torch comprising a head having a thread formed thereon, a primary pipe delivering gas to a conical cavity formed in said head, a secondary pipe delivering gas to a groove formed in the wall of said cavity, a body, a mixing tube secured at one end in said body and tapered at the other end to seat in said cavity, a nut having a thread engaging the thread on said head and engaging a shoulder formed on said mixing tube, a quill threaded in a central opening in said mixing tube and having a conical head seating in said body, a heating jet pipe secured in said body and connected through openings in said mixing tube with said primary and said secondary pipes, a cutting jet pipe connected through passages with said primary pipe, a manually operable valve spring actuated to close one of said passages between said primary and said cutting jet pipe, and a tip fed with gases from said heating jet pipe and said cutting jet pipe.

5. In a cutting torch, the combination of: a head having a cavity therein; an oxygen pipe delivering oxygen to the center of said cavity; a pipe delivering hydrogen through the wall of said cavity; a tip having a heating jet passage for a combustible mixture of said oxygen and hydrogen and a separate passage for an independent jet of oxygen; walls forming a direct passage between said oxygen pipe and said separate passage; a manually operable valve situated in said passage between said cavity and said tip; members forming a mixing chamber into which both oxygen and hydrogen are fed; and walls forming a passage between said mixing chamber and said heating jet passage.

6. In a cutting torch the combination of a head having a cavity therein; an oxygen pipe delivering oxygen into said cavity; a hydrogen pipe delivering hydrogen into said cavity; means detachably secured in said cavity and having oxygen and hydrogen passages so formed therein that said passages each form a continuation of one of said pipes when said means is so secured; walls forming a mixing chamber fed with gas from both of said passages; a tip having a heating jet channel and a cutting-jet channel therein; walls forming a heating-jet conduit connecting said mixing chamber with said heating jet channel; walls forming a cutting jet conduit connecting said oxygen passage with said cutting jet channel; and a manually operable valve in said cutting jet conduit.

In testimony whereof, I have hereunto set my hand at Los Angeles, California, this 28th day of May, 1920.

CLARENCE J. COBERLY.